Sept. 12, 1967   M. F. PETERS   3,340,887
AIR RELEASE VALVE ASSEMBLY
Filed Dec. 6, 1965   2 Sheets-Sheet 1
FIG. 1
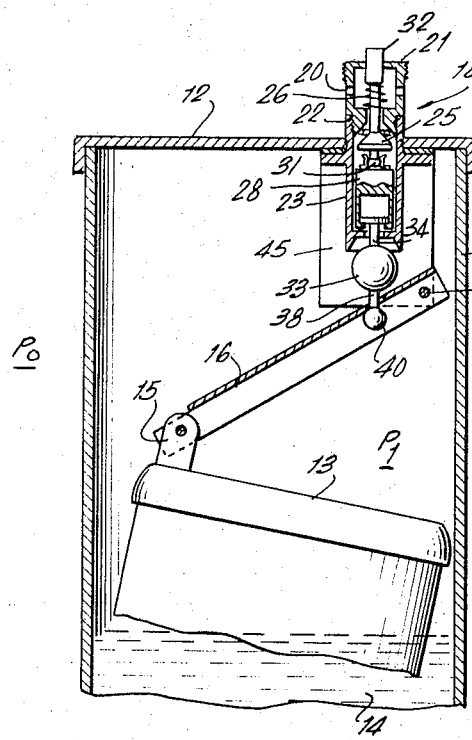
FIG. 2
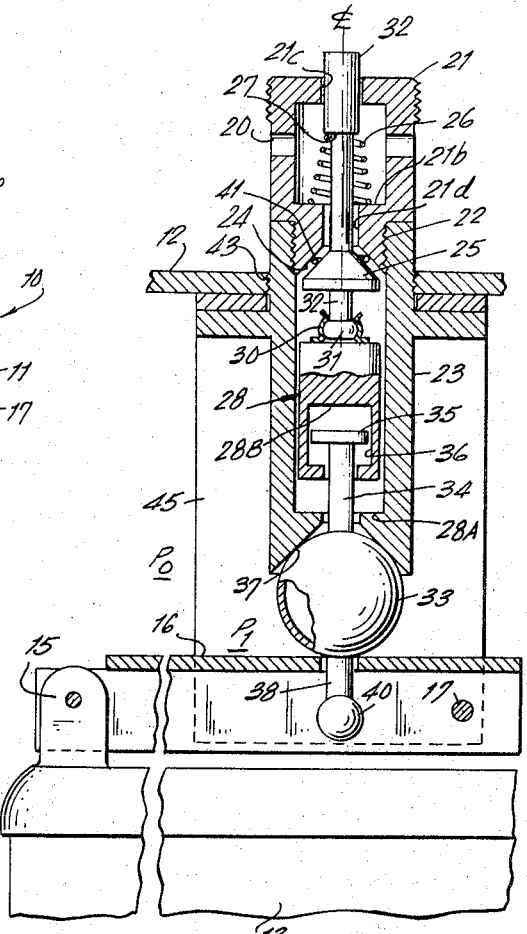
FIG. 3
INVENTOR.
MELVILLE F. PETERS
BY
ATTORNEY Sept. 12, 1967     M. F. PETERS     3,340,887
AIR RELEASE VALVE ASSEMBLY
Filed Dec. 6, 1965     2 Sheets-Sheet 2

INVENTOR
MELVILLE F. PETERS
BY
ATTORNEY

United States Patent Office 3,340,887
Patented Sept. 12, 1967

3,340,887
AIR RELEASE VALVE ASSEMBLY
Melville F. Peters, 29 N. Ridge Road,
Livingston, N.J. 07039
Filed Dec. 6, 1965, Ser. No. 511,782
10 Claims. (Cl. 137—202)

This invention relates to an air release valve assembly for use in fluid systems which may contain two fluids such as air and water. The invention has particlular reference to a valve assembly which releases the air but retains the water. The invention also relates to safety features and means for replacing the valve of the assembly without draining the liquid from the system.

Air release valves are old in the art and have been used for many years. Their primary function is to release entrapped air from water pipes. Many of these valves are hard to repair and whenever dirt or some other foreign substance is lodged between the valve seat and the movable valve member, the valve will leak both air and water, and then the whole system must be cut off and drained before repair can be made. Some prior valve assemblies have included a primary valve for the main operating function and a safety valve which operates only when the primary valve does not function. These valves are difficult to repair because the entire valve assembly must be removed from the piping system. Again, this requires shutting off the water and draining the system. The present invention contains many features which improve the release assembly. First, the safety valve is mounted inside the valve system so the fluid must first pass the safety valve before passing through the primary valve. Second, the safety valve and the primary valve are loosely coupled to each other so that the primary valve closes before the safety valve but still permits the safety valve considerable motion for operating if the primary valve does not close properly. Third, the primary valve may be detached from the valve assembly without removing the safety valve, thereby permitting easy repair or replacements without turning off the water supply or draining the system. Fourth, the movable portion of the safety valve can be constructed of a sphere which has a density less than the density of water and therefore will be buoyed by the water to close the safety valve in case the float does not function properly.

An object of the present invention is to provide an improved air release valve assembly which avoids one or more of the disadvantages and limitations of prior art arrangements.

Another object of the present invention is to provide an air release assembly including a primary valve for separating a fluid of lesser density from a fluid of greater density and a safety valve for shutting off the flow of the denser fluid in case the primary valve fails.

Another object of the present invention is to position the safety valve at a place in the assembly where it acts to shut off the denser fluid before it reaches the primary valve.

A further object of the present invention is to provide a release means so that the primary valve can be removed from the valve assembly for repair or replacement without cutting off the water supply or draining the system.

A still further object of the present invention is to insure that the safety valve will close even though the float means does not operate properly.

The invention includes a separation chamber which is connected to a main piping system and which may include two or more fluids having different densities. A float is positioned in the chamber and is adapted to be lifted by the denser fluid. A primary valve is secured to the top portion of the chamber and includes a valve seat and a movable valve member coupled to the float and adapted to make contact with the valve seat when the float is lifted a predetermined distance by the denser fluid. This movement closes the valve. A safety valve is also loose-coupled to the float and includes a valve seat and a movable valve member adapted to make contact with the seat after the float has been raised an additional distance.

A feature of the present invention is to make the sealing disc or ball of the safety valve from material having a density less than the density of the denser fluid.

Another feature of the present invention is a detachable coupling between the safety valve member and the primary valve so that the primary valve may be removed without operating the safety valve.

For a better understanding of the present invention, together with other and further objects thereof, reference is made to the following description taken in connection with the accompanying drawings.

FIGURE 1 is a cross-sectional view of a separation chamber showing a float, a primary valve, and a safety valve.

FIGURE 2 is a cross-sectional view of the valves shown in FIGURE 1.

FIGURE 3 is a cross-sectional view similar to FIGURE 2 but showing an alternate means for disengaging the primary valve mechanism from the assembly.

Figure 4:
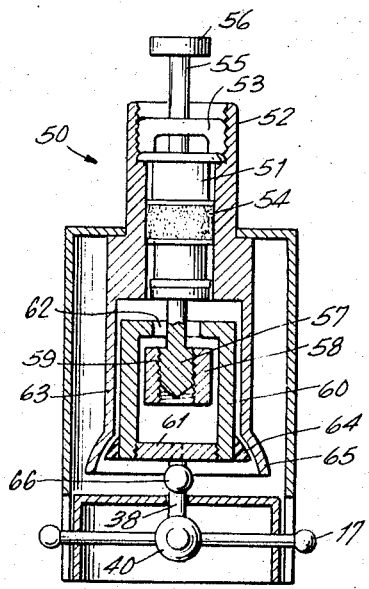
FIGURE 4 is a cross-sectional view similar to FIGURES 2 and 3, but showing an alternate arrangement of parts whereby the sealing surfaces of the safety valve are shaped as inverted cups.

Referring now to FIGURES 1 and 2, a container 10 includes a cylindrical envelope 11, a top cover portion 12, and a bottom portion (not shown) which includes a conduit for connection to a piping system or any other closed system which may contain air and water or two fluids having different densities. In the following description, water and air will be referred to as the two fluids in the closed system. However, this invention can be employed to separate other fluids, the only requirement being that the two fluids have different densities.

Within the separation container 10, there is a float 13, generally made of copper, enclosing a large volume of air. Floats formed from plastics in the solid form may be used, the only requirement being that the average density of the float be less than the density of the liquid 14 in the bottom of the container. The upper portion of the float obviously will remain above the top portion of liquid 14, so long as the primary valve closes before the float is buoyed above some predetermined level. The float will rise and fall with the liquid. At the top of the float a bracket 15 is secured which rotatably secures an arm 16, this arm having its other end rotatably supported by pin 17. The two ends of pin 17 are supported by vertical plates 45.

The valve assembly 18 is mounted on the top cover portion 12 of container 10 and a cylindrical part 21, 23 of the valve assembly 18 extends through a hole in the top cover portion 12 and includes a vent 20 for delivering air into ambient space. The top of the cylindrical portion 21, 23 of the valve assembly is detachable from the rest of the valve array, this means including a threaded portion 22 by which the cylindrical portion may be unscrewed from the main cylinder 23. Rod 32 extends through the cylindrical portion 21 and enters a portion of cylinder 23. The upper end of the rod 32 is enlarged to form shoulder 27 and a spherical button 31 is secured to the lower end. Sealing cone 25 is secured at the proper position on the rod, so that when the rod is pushed up, cone 25 will contact seat 24 and form a hermetical seal. When the rod 32 is lowered, the cone 25 will pull away from the seat and allow fluids to pass between the two sealing surfaces 24, 25. Rod 32 is limited to movement along the axis ¢ by guiding openings $21_c$, $21_d$, of cylindrical portion 21. One end of spring 26 pushes against shoulder 27 on rod 32 and the other end pushes against the inner bottom wall $21_b$ of the cylindrical portion. Tests have shown sealing between seat 24 and cone 25 can be improved by providing an O ring or other shaped elastomer 41 between the two mating surfaces 24, 25. The lower portion 23 of the valve assembly houses a coupling means 28 which includes a main cylindrical portion topped with a plurality of resilient fingers 30 which normally grasp the spherical button 31 of the movable valve rod 32. The lower portion of cylinder 28 includes a loose coupling means for connecting with a second movable valve member 33 connected to a rod 34 and a top disc 35 which moves within a cavity 36 in the bottom of cylinder 28.

Sphere 33 is the movable valve member which may move into contact with a valve seat 37 in the bottom of cylinder 28 and thereby prevent the movement of water from the interior of chamber 10 into the lower portion of the valve assembly. FIGURE 2 shows the upper or primary valve closed due to the action of spring 26. The lower portion of the valve assembly is also closed because sphere 33 is seated within the safety valve seat 37. The safety valve is closed only because arm 16 has been moved to a horizontal position by the entrance of water into the lower part of the chamber. Under normal circumstances when the float 13 moves upwardly, valve 25, 41, 24, are closed and there is no further action. However, in case of increased pressure or failure of the primary valve to stop the flow of fluid, the float 13 may move into the position shown in FIGURE 2 and thereby close the safety valve. The sphere 33 is formed with a lower extending rod 38 terminated by a sphere or disc 40 so that, when the float 13 drops to the position shown in FIGURE 1, the sphere 33 and the valve member 25 are both pulled downwardly and both the safety valve and the primary valve are opened.

The lower portion 23 of the valve assembly includes a shoulder 42 and a screw thread 43. The valve is permanently secured to the upper portion 12 of chamber 10 and holds a turned-over portion 44 of two vertical plates 45 which are employed to mount pin 17.

The operation of this device is evident from its construction and from the description given above. As soon as the float 13 is lowered and both valves are opened, the air above the water passes through both valves and through the openings 20. The escape of the air permits the liquid 14 to move up within the chamber, carrying the float with it and permitting the spring 26 to close the primary valve 24, 41, 25.

When the primary valve 18 is damaged or clogged with dirt, the upper cylindrical portion 21 of the valve assembly is unscrewed from the lower portion 23 and removed. This operation is possible since the spherical button 31 is released by the plurality of resilient fingers 30, when the pull-on rod 32 exceeds the maximum pull exerted by the float lever combination 13, 16, by one or more orders of magnitude. After the malfunctioning portion 21 of valve assembly 18 has been removed, it may be repaired or replaced by a new portion. The repaired or new portion is then screwed into place, after which, rod 32 is pushed down until button 31 is forced into the retaining enclosure provided by resilient fingers 30. The downward movement of fingers 30 is limited by the cylindrical element 28 when it bottoms on shoulder $28_a$ on the lower portion 23. It is obvious that, when the upper cylindrical portion 21 is removed or when valve surfaces 24, 25, fail to form a seal, the water in container 10 will then move the float 13 upwardly until the arm 16 causes sphere 33 to make contact with the safety valve seat 37 and stop the flow of water before it reaches vents 20. It should be noted that disc 35 will contact shoulder $28_b$ before the bottom of cylindrical element 28 contacts shoulder $28_a$. This contact provides a means for breaking the seal between ball 33 and sealing surface 37. At high pressures it is necessary to provide such a structure since ball 33 is held closed by the pressure differential between the pressure $P_1$ in container 10 and the ambient pressure $P_0$, so that the force exerted by the liquid on the ball may be far greater than the downward force exerted by float 15 acting through lever 16. When draining the system is convenient, the safety valve portion of the valve assembly may be eliminated and the primary valve replaced in the drained system by taking advantage of the snap connection of the button 31 on fingers 30.

The valve assembly shown in FIGURE 3 is similiar to that shown in FIGURE 2 except that cylinder 28 has been replaced by an assembly of resilient spring fingers 46. These fingers are formed integral with a base portion 47 which is formed with a hole and normally supports the disc 35. The arm 16 is formed with an offset $16_a$ adjacent the sphere 33 so that it imparts only vertical movement to the sphere.

FIGURE 4 is a cross-sectional view of an alternate arrangement of parts having a complete valve assembly 51 secured to the upper portion 52 of the supporting structure 50. The valve 51 is secured in place by turning nut 53 until the mating surfaces 54 between valve 51 and structure 50 forms a hermetical seal. Rod 55 passes through valve assembly 51. Disc button 56 is secured to the upper end of the rod and the threaded fitting 57 is secured to the lower end. When rod 55 is pushed down, either by pressing button 56, or by pulling down on fitting 57, the valve will open and allow fluid to pass. When the rod is released, the spring (not shown) in the valve 51 pushes the rod up and closes the valve. This action stops the flow of fluid.

Mating threads 59 allow fitting 57 to be screwed into and out of bushing 58. The outer surface of the bushing may be square, rectangular or elliptical, but not circular. Thimble 60 has an inner surface which mates with the non-circular outer walls of bushing 58. The bushing 58 can move axially in thimble 60, but because of the non-circular shape of the mating walls, it cannot rotate when fitting 57 is screwed into or out of bushing 58.

The lower end of thimble 60 is closed by disc 61 and the upper end has an opening 62 with a diameter greater than the diameter of fitting 57. The outer walls of thimble 60 are cylindrical with circular cross-section and can move axially with respect to the lower cylindrical portion 63 of the supporting structure 50.

Attached to the lower end of the outer surface of thimble 60 is a ring having a spherical surface 64 which mates with a second spherical surface 65 on the lower end of the cylindrical portion 63 of supporting structure 50. When mating surfaces 64, 65, are pressured together, a hermetical seal is formed which prevents fluids reaching valve 51. These surfaces 64, 65, are the sealing elements of the safety valve.

The float arm 16 is loose coupled to rod 38 as before and this rod is connected directly to the inner cylinder 60 by means of a disc 61. Clamped to rod 38 is ball 66.

This ball is positioned on the rod so that when float 13 moves lever arm 16 to a horizontal position, surface 64 will be pressed tightly against surface 65 to form a seal. This seal prevents the flow of fluid beyond these surfaces and when pressed together, primary valve 51 can be removed from the assembly without losing liquid from the system. Removal of the primary valve 51 for any reason is done by turning nut 53 and disc 56 simultaneously counter-clockwise. Bushing 58 is prevented from turning during this unscrewing operation because it has a non-circular cross-section mating with the non-circular cross-section in thimble 60, and thimble 60 cannot turn because it is held by rod 38 and pin 17. Since the fluid will continue to rise until arm 16 is horizontal, the safety valve will always be closed during the removal and replacing of valve 51 and consequently no fluid is lost from the system when valve 51 is removed from the assembly.

The valve is replaced by turning nut 53 and disc 56 simultaneously clockwise. After both threads are screwed into place the safety valve is released from its closed position by forcing rod 55 down until bushing 58 acting on disc 61 causes sealing surface 64 to move away from 65.

Figure 5:
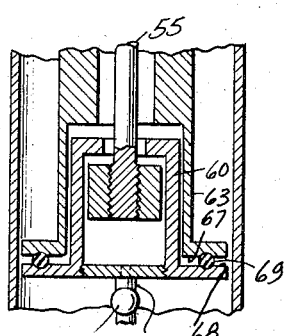
FIGURE 5 is a cross-sectional view of an alternate form of the valve shown in FIGURE 4.

FIGURE 5 is a cross-sectional view of the valve shown in FIGURE 4 with an alternate form of safety valve. In this arrangement the spherical surfaces 64, 65, in FIGURE 4 are replaced by flanges with flat surfaces 67, 68, respectively. A resilient ring 69 is placed between these flanges and when rod 38 is moved upwardly by the float rising until the lever arm is horizontal, the two flanges 67, 68, squeeze the ring 69 and close the safety valve.

Figure 6:
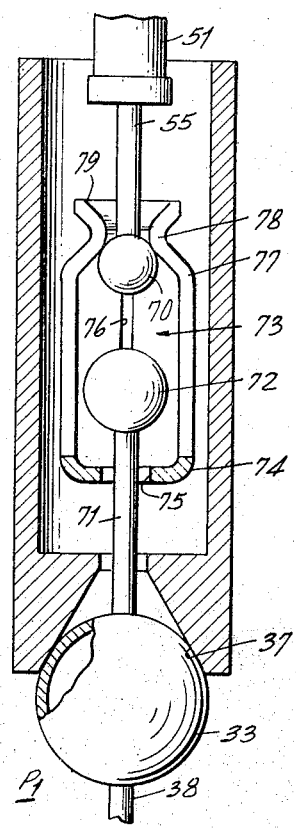
FIGURE 6 is a cross-sectional view similar to FIGURE 2 but showing a variation of construction whereby the primary valve is loose coupled to the safety valve and includes an alternate means for disengaging the primary valve.

FIGURE 6 is a cross-sectional view of one form of a coupling between the safety valve 33, 37, and the rod 55, which actuates the sealing surfaces of the primary valve 51 shown in FIGURE 4. The threaded element 57 on rod 55 in FIGURE 4 has been replaced by spherical portion 70, while the movable portion 33 of the safety valve has its rod 71 terminated by a similar spherical portion 72. Both spherical portions 70 and 72 are enclosed within a spring coupling means 73 having a base portion 74 formed with an axial hole 75 through which rod 71 passes. The side portions of coupling 73 are separated vertically by a plurality of slots 76 thereby forming a plurality of spring members 77. Each spring member 77 has an upper turned in portion 78 which normally engages the upper sphere 70 and an outwardly flared portion 79.

Figure 7:
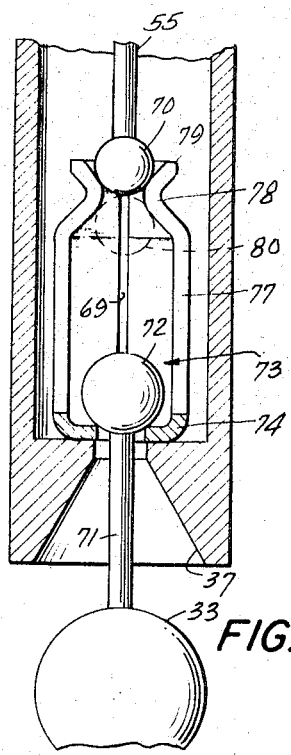
FIGURE 7 is a cross-sectional view similar to FIGURE 6, showing the arrangement of parts when the primary valve coupling of FIGURE 6 has been disengaged from the safety valve mechanism.

When it is desired to remove the primary valve from the valve assembly, the upper portion of the valve assembly 51 (FIG. 4) is unscrewed and the primary valve is pulled out, separating the top portions 77 of springs 73 so that the sphere 70 is disengaged. The disengagement of sphere 70 is shown in FIGURE 7. This FIGURE also shows how the primary valve may be reassembled by pressing on the valve assembly and forcing the sphere 70 past the spring flared ends 79, and into the position shown by dotted line 80. To clarify the snap action between ball 70 and spring fingers 73, the safety valve 33–37 is shown open, as it would be if the system were drained. It is important to note that when the system is under pressure, ball 33 will be forced against seat 37 with a relatively great force. This force may be great enough to allow sphere 70 to become engaged with spring coupling means 73 without breaking the seal between ball 33 and the seat. This action is desirable since valve 51 has been replaced with the system remaining at a high pressure.

To allow the valve to operate normally it is necessary to break the seal between ball 33 and seat 37, and equalize the pressure on both sides of ball 33. This is done by pushing down on rod 55 until spherical element 70 acting through spherical element 72 and rod 71, moves ball 33 away from seat 37. The operation of replacing the primary valve and releasing the safety valve when the pressure differential is great, requires a careful control of the dimension in the disconnect assembly. The use of the two spherical elements 70, 72, in the disconnect assembly allows a swivel action with respect to arm 16. It has been found that this swivel action allows the moment of the lever arm to increase by 100 percent when the float drops from its highest to its lowest position. This compensates for the increase in the spring force which takes place in the valve as it is opened.

Figure 8:
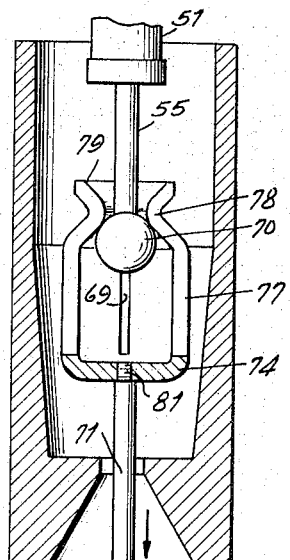
FIGURES 8 and 9 are cross-sectional views showing an alternate form of disengaging means, FIGURE 8 showing the primary valve coupled to the safety valve, and FIGURE 9 showing them in their disengaged position.
Figure 9:
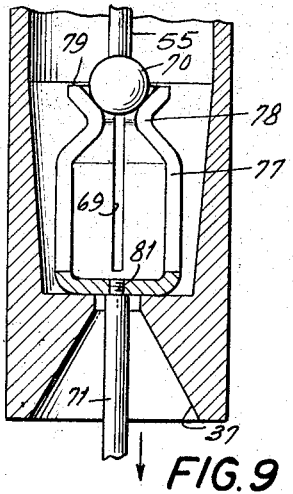

FIGURES 8 and 9 are cross-sectional views somewhat similar to FIGURES 6 and 7, but in this alternate arrangement rod 71 is secured to the spring cage 77 by means of a screw thread 81. FIGURE 8 shows the assembly in its operating position with sphere 70 held within spring cage 77. FIGURE 9 shows the sphere 70 disengaged from the springs for withdrawal of the primary valve. The procedure for replacing the primary valve 51 with or without the system under high pressure is the same as for the valve shown in FIGURES 6 and 7.

From the above description it will be evident that the valve assembly not only contains a primary valve and a safety valve but also contains a means for disengaging the primary valve for repair or replacement while the safety valve shuts off the flow of liquid from the chamber.

Having thus fully described the invention, what is claimed as new and desired to be secured by Letters Patent of the United States, is:

1. An air release valve assembly for releasing air from a liquid system comprising, a release chamber connected to the liquid system, a float within said chamber having an average density less than the density of the liquid, a primary valve removably secured to the valve assembly, said valve including a housing removably connected to said chamber having a first valve seat and a first movable valve member biased against said valve seat, a safety valve coupled to the float for preventing the escape of the liquid when the primary valve fails or is removed from the assembly, said safety valve including a second valve seat secured to the valve assembly between the first valve seat and the chamber and a second movable valve member coupled to the float and adapted to make contact with the second valve seat after the float has been moved a predetermined distance by the liquid, lost motion connection means between the first and second valve members arranged so that after a predetermined opening of said second valve member said first valve member is opened, and means for separating the first and second valve members for permitting removal of the primary valve.

2. A valve assembly as claimed in claim 1 wherein said safety valve movable valve member is loose coupled to the float and makes contact with the safety valve seat when the float has moved upwardly a distance which is greater than the distance required to close the primary valve.

3. A valve assembly as claimed in claim 1 wherein a spring is coupled between a portion of the valve assembly and the first movable valve member for closing the primary valve when the float moves above said predetermined distance.

4. A valve assembly as claimed in claim 1 wherein said first valve seat is secured to the valve assembly by a screw and nut means.

5. A valve assembly as claimed in claim 1 wherein said first movable valve member is connected to a spherical end portion normally resiliently held by a loose coupling means including a plurality of resilient fingers.

6. A valve assembly as claimed in claim 1 wherein the movable valve member of the safety valve is loose coupled to the movable valve member of the primary valve by means of a piston and cylinder combination.

7. A valve assembly as claimed in claim 1 wherein a manually operable release valve is associated with the primary and safety valves.

8. A valve assembly as claimed in claim 1 wherein said safety valve includes a cup member which floats on the surface of the water in the separation chamber and closes the safety valve by application of the upper surface of the cup making contact with an annular rim.

9. A valve assembly as claimed in claim 1 wherein the movable valve member of the safety valve is loose coupled to the movable valve member of the primary valve by means of a sphere resiliently held by a plurality of retaining springs, said sphere secured to one valve member and said retaining springs secured to the other valve member.

10. A valve assembly as claimed in claim 9 wherein said valve members are loose coupled to each other by means of a double sphere combination, both of said spheres held by a plurality of retaining springs, one of said spheres secured to the primary movable valve member and the other sphere secured to the safety movable valve member.

References Cited

UNITED STATES PATENTS 939,196  11/1909  Goff _____ 137—202

ALAN COHAN, *Primary Examiner.*